(12) United States Patent
Wang

(10) Patent No.: US 11,495,007 B1
(45) Date of Patent: Nov. 8, 2022

(54) AUGMENTED REALITY IMAGE MATCHING

(71) Applicant: RHIZOMENET PTY. LTD., Melbourne (AU)

(72) Inventor: Yue Wang, Melbourne (AU)

(73) Assignee: RHIZOMENET PTY. LTD., Melbourne (AU)

(*) Notice: Subject to any disclaimer, the term of this patent is extended or adjusted under 35 U.S.C. 154(b) by 0 days.

(21) Appl. No.: 17/561,253

(22) Filed: Dec. 23, 2021

(51) Int. Cl.
*G06V 10/22* (2022.01)
*G06V 20/20* (2022.01)
*G06V 10/44* (2022.01)
*G06V 10/20* (2022.01)

(52) U.S. Cl.
CPC .......... *G06V 10/225* (2022.01); *G06V 10/255* (2022.01); *G06V 10/443* (2022.01); *G06V 20/20* (2022.01)

(58) Field of Classification Search
CPC .... G06V 10/225; G06V 10/443; G06V 20/20; G06V 10/255
See application file for complete search history.

(56) References Cited

U.S. PATENT DOCUMENTS

| | | |
|---|---|---|
| 10,820,144 B1 | 10/2020 | Wang |
| 2015/0286481 A1* | 10/2015 | Walker ................ G06F 16/9038 235/375 |
| 2018/0211404 A1* | 7/2018 | Zhu ........................ G06T 17/10 |
| 2019/0198161 A1* | 6/2019 | Lee ......................... G16H 40/20 |
| 2020/0389564 A1* | 12/2020 | Kodimer ............ H04N 1/00408 |
| 2021/0295604 A1* | 9/2021 | Xiu ....................... H04N 13/139 |
| 2022/0044016 A1* | 2/2022 | Pan ........................ G06V 20/20 |

OTHER PUBLICATIONS

Augmented Images for Android NDK, https://developers.google.com/ar/develop/c/augmented-images, updated Dec. 13, 2021, 6 pages.
More to Explore with ARKit 5, https://developer.apple.com/augmented-reality/arkit, Dec. 2021, 4 pages.

* cited by examiner

*Primary Examiner* — Kenny A Cese

(57) ABSTRACT

A computer-implemented method is for identifying the presence of an image trigger in a digitally captured scene. The method includes, at a component installed on a client device and upon commencement of an image trigger matching operation:
a) obtaining, from a multiplicity of image triggers, a subset of image triggers;
b) subdividing the subset of image triggers into a plurality of image trigger sub-subsets; and
c) for each sub-subset of image triggers in turn, and at predefined time intervals, submitting the sub-subset of image triggers to an Augmented Reality (AR) core Application Programming Interface (API), to cause the client device to cache the received sub-subsets of image triggers, search the digitally captured scene for the presence of one or more of the cached image triggers, and identify a positive match of an image trigger to said component using said AR core API.

8 Claims, 3 Drawing Sheets

AUGMENTED REALITY IMAGE MATCHING

TECHNICAL FIELD

The present invention relates to a method of distributing contents over a content distribution system. In particular, though not necessarily, the invention relates to such a method for distributing contents that are displayable on client devices present at associated locations, in response to the recognition of an image trigger in a current view.

BACKGROUND

Quick Response (QR) codes are a well-known example of an optically machine readable code. QR codes are often positioned in public places, for example at restaurants or tourism sites, as a means to quickly deliver content to a consumer's mobile device. Conventional "scannable" codes such as QR codes have a number of drawbacks however. In particular, QR codes are generic in appearance, and the ways in which they can be customised for aesthetic, marketing, or other purposes while preserving functionality are severely limited.

It is therefore desirable to achieve the functionality of QR codes using images of a user's choice, referred to hereinafter as "image triggers", for example an image of a product, or images associated with a marketing campaign.

SUMMARY

We describe herein a method of serving contents to client devices, especially but not necessarily, at specific locations, using image recognition of generated image triggers. Images and image triggers may be 2D or even 3D.

Replacing highly standardised QR codes with freely chosen image triggers presents significant technical challenges, in particular with respect to scalability. As more content is added to the system, the computational task of matching an image trigger to its corresponding content becomes more demanding and time consuming. This is compounded by the currently available Augmented Reality cores (AR cores) which place tight limits on the numbers of image triggers that can be searched for in a current view at any given time.

The present method addresses this technical problem by limiting the size of the search space based on both consumer and content location, and by facilitating sequential searches using respective different sub-subsets of image triggers, resulting in a much improved service and user experience.

According to a first aspect of the present invention a computer-implemented method of identifying the presence of an image trigger in a digitally captured scene. The method comprises, at a component installed on a client device and upon commencement of an image trigger matching operation:
a) obtaining, from a multiplicity of image triggers, a subset of image triggers;
b) subdividing the subset of image triggers into a plurality of image trigger sub-subsets;
c) for each sub-subset of image triggers in turn, and at predefined time intervals, submitting the sub-subset of image triggers to an Augmented Reality, AR, core Application Programming Interface, API, to cause the client device to
 cache the received sub-subsets of image triggers, wherein any previously cached image triggers are overwritten,
 search the digitally captured scene for the presence of one or more of the cached image triggers, and
 identify a positive match of an image trigger to said component using said AR core API,
d) the method further comprising, upon completion of step c), substantially immediately repeating step c) one or more times, wherein the method results in a search of the digitally captured scene which cycles through the sub-subsets of image triggers in turn for the duration of the operation.

The component may an application, or app, installed on the client device. The commencement of an image trigger matching operation may occurs upon opening of the app. The operation may be terminated upon closing of the app or switching to a non-AR view within the app.

The client device may be a device running one of Android or Apple iOS, and AR core is ARCore or ARKit respectively, for example, a smartphone, smartwatch, tablet, or a pair of smart glasses.

The method may further comprise sending to a server, a request including a current location of the client device, receiving in response to said request, from said server, said subset of image triggers, the subset selected from said multiplicity of image triggers based upon said current location.

An AR core of the client device may provide for the identification of a three dimensional object and each image trigger comprises a plurality of triggers corresponding to different views of an object from different angles.

According to a second aspect of the present invention there is provided a method of providing Augmented Reality content on a client device, the method comprising using a camera of the device to acquire a digitally captured scene, displaying the scene on a display of the client device, using the method of the above first aspect of the present invention to identify the presence of an image trigger in the digitally captured scene, obtaining content associated with a matched image trigger; and presenting the obtained content as AR media on the display, overlaid on the digitally captured scene.

DETAILED DESCRIPTION

The following disclosure is concerned with a content distribution application or "app", in which contents may be associated with location data and image "tags" or "triggers". In response to capturing an image of an image trigger in a given location, consumers can be served with particular content, which may then be viewed via a consumer device interface.

In the context of mobile devices such as smartphones, it is known to provide so-called Augmented Reality (AR) functionality to provide for enhanced user experiences. This functionality is referred to hereinafter using the generic term "AR core". For example, Android™ provides as an AR core its ARCore that allows developers to build apps that can detect and augment images within an image field captured by a device's camera. In use, an app installed on the Android device provides a number of image triggers to the ARCore functionality of the device (a combination of hardware features and code of the operating system) using the ARCore API, and the functionality searches for these triggers in a captured image. ARCore is able to detect triggers largely independent of orientation and relative size. The ARCore functionality of the device signals the detection of a trigger to the instructing app, via the API. The app can then, for example, overlay additional media on the displayed image (e.g. captured field). This is described for example at: https://developers.google.com/ar/develop/c/augmented-images. Apple™ iOS provides for similar AR core functionality with its ARKit: https://developer.apple.com/augmented-reality/arkit/. The solution described here, when implemented on a smartphone or similar device, may make use of such AR functionality. Specifically, the app referred to above may interface with the AR core functionality of the device using the AR core API appropriate to the used device type.

Current AR functionality places limits on the number of image triggers that can be searched for at any given time: the limit for ARCore is currently 20, whilst that for ARKit is currently 100. Whilst it can be expected that these inherent limits will increase in the future, e.g. due to increased processing power and memory, there will likely always be some restrictions placed on the number of image triggers that can be searched for at any given time.

Figure 1:
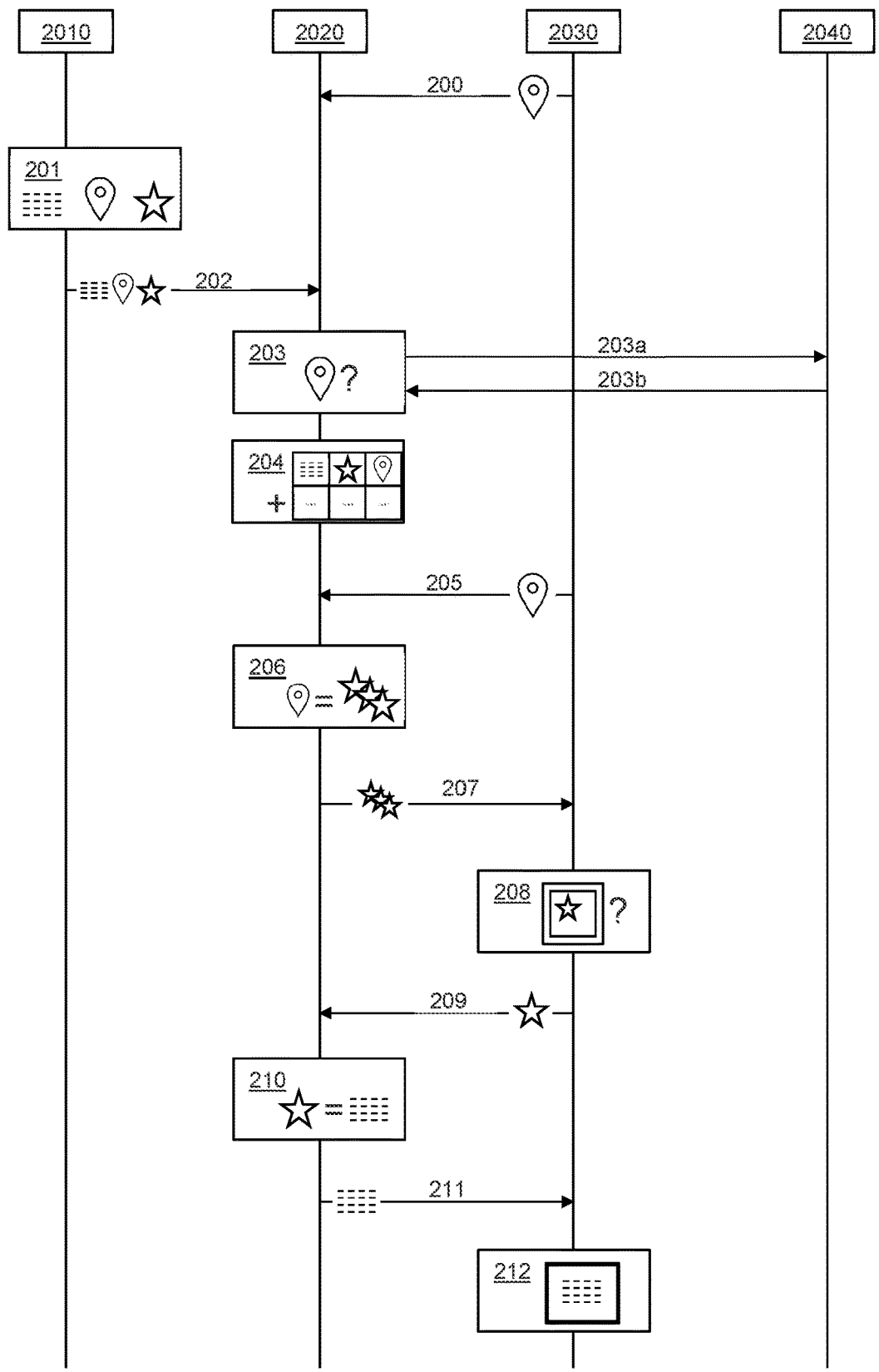
FIG. 1 is a diagram of a content distribution flow in an exemplary method.
Figure 2:
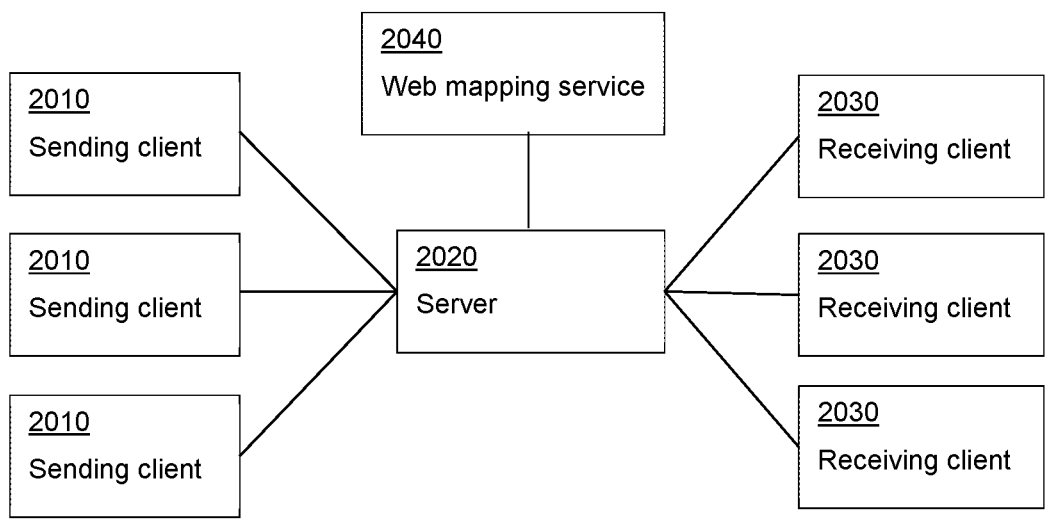
FIG. 2 is a network diagram showing connections between the entities involved in FIG. 1.

FIG. 1 illustrates an exemplary content distribution flow according to the present method, whilst FIG. 2 shows an exemplary network on which the method may be implemented.

The network comprises a plurality of sending clients 2010, a server 2020 (which may be a server cluster or server cloud), a plurality of receiving clients 2030, and a web mapping service 2040. The sending client 2010 may also be capable of receiving, and the receiving client 2030 may also be capable of sending—the names simply refer to their roles in the method presented. The clients 2010, 2030 may be smartphones, tablets, PCs, wearables including wrist worn devices, etc. However, for the purposes of this discussion they are assumed to be smartphones running one of Android or iOS operating systems. Connectivity between clients 2010, 2030, the server 2020, and the web mapping service 2040 is provided by any suitable communications network(s). For example, the clients 2010, 2030 may be connected to the Internet via cellular or WiFi networks, whilst the server 2020 and mapping service 2040 may be coupled to the Internet via an enterprise network and a broadband network.

Referring again to FIG. 1, in step 200, each receiving client 2030 periodically sends its location to the server 2020. This might result from a user opening the app on his or her device, or selecting a refresh option. Alternatively, the app may provide background updates periodically (for example every 5 or 10 minutes) without requiring specific user input.

In step 201, one of the sending clients 2010 generates contents or a first content identifier to be distributed to intended recipients, herein referred to as consumers or client devices (the users of the receiving clients 2030 are considered to be consumers of the contents). Businesses may pay a subscription to use this service (via their respective sending clients 2010), or may pay on a per-message basis, or using some other payment model.

Each piece of content or first content identifier is associated with a location search term, and an image trigger [in FIG. 1, contents or first content identifiers are represented by dashed lines, location search terms and locations are represented by location "pin" icons, and image triggers are represented by stars]. In an example, contents or first content identifiers, as well as the associated location search terms and image triggers, may be generated on a separate user device, and uploaded to the sending client device 2010.

Content may include various multimedia contents, e.g. any combination of text, images, video, audio, live stream or chat, documents, representations of 3D objects, additional location data (i.e. a location other than the associated content location described herein), etc. A suitable first content identifier may comprise for example a URL, or any other data capable of directing a consumer or consumer device 2030 to a piece of content.

Alternatively of course, media may be provided to consumer devices together with respective image triggers and saved in local memory. This latter approach would allow the method to be implemented with the device online (at least when image scanning is performed).

Unlike conventional QR codes and other standardised codes, the properties of the image trigger are not particularly limited, provided that it is capable of being correctly and reproducibly identifiable by image recognition when present in a captured image (features such as a clean background, for example, may assist in the image recognition process). This allows sending users free choice to select an image trigger that is distinctive or otherwise suitable for their particular needs. For example, a business may wish to use a company logo or a product as the image trigger. Other public spaces (e.g. galleries, museums, transport hubs, tourist information points etc.) may wish to use images associated with or identifying a specific point of interest or exhibit, for example.

A user associated with the sending client (herein referred to as a "sending user") may choose to distribute the chosen/uploaded image trigger in various ways within a desired geographical area, for example at particular stores, bus stops, or on product packaging, pamphlets etc., as is standard practice with existing QR codes and the like. The present method also allows for sending users to specify image triggers which may already be present at the desired geographic location. For example, a company logo may already be visible in a store window or on items within the store, or an image trigger may be defined as a landmark building or feature, e.g. Big Ben in the centre of London. This reduces the need for dedicated machine readable codes such as QR codes to be physically installed at the location. Unlike QR codes, the image triggers and associated content described herein can therefore be updated quickly and entirely remotely through the network shown in FIG. 2.

The location search term comprises information capable of designating a "content location". The content location may indicate a geographical location of the associated image trigger, or may specify a geographical location from which a consumer device 2030 can access the content upon capturing an image of the trigger (these locations may or may not be equivalent). For the purposes of the present disclosure, unless otherwise stated, the term "location" is considered to refer to both a specific point location, as well as a location range. In particular, the location search term is capable of being searched by a service application programming interface (API), such as the Google™ mapping service API, to identify the content location.

In some examples, the sending user may wish to associate a single piece of content with multiple locations. In this case, the location search term may be capable of defining a multiplicity of locations (e.g. up to 10,000 or more). Consider the example of a chain of supermarkets which wishes to make content available to customers upon the capture of an image of a trigger within any one of the individual stores in the chain. The content might include for example a discount code that a consumer can use to obtain a discount on items purchased (e.g. "Celebrate Valentine's Day; discount code 12345"). The content may then include only static content (i.e. the same for each location of the set), or it may include both static and dynamic content, where the dynamic content depends on which of the set of associated locations corresponds to the consumer device 2030 location. For example, the contents may include a first image which is a product advertisement (static content), and a set of second images which is a picture of the storefronts of the associated locations (dynamic content), defined such that only the picture for the associated location will be sent by the server 2020 to the receiving client 2030. Alternatively, the contents may include text containing both static and dynamic content, e.g. "Come to your local shop at ((address)) for great deals today!", where the data sent to the server 2020 comprises a lookup table of addresses for each of the set of associated locations, and the server 2020 substitutes the relevant address for "((address))" in the contents prior to sending the content to the receiving client 2030.

In step 202, the sending client 2010 sends the content or first content identifier, the location search term, and the image trigger to the server 2020. This may be done using a "business platform" interface or website having a field or fields for each of the content, the location search term, and the image trigger.

In step 203, the server 2020 identifies the content locations associated with the location search term. These might be, for example, the addresses of stores in a chain, their GPS or geographic coordinates, i.e. latitude and longitude, or another suitable representation. The server 2020 may perform this step by submitting (203*a*) the location search term to an appropriate API 2040, such as the Google™ mapping service application programming interface (API), to perform a search using the location search term. The server 2020 then receives (203*b*) a results list including a plurality of content locations.

In step 204, the server 2020 adds the content or first content identifier, the image trigger, and the plurality of content locations to a distribution database or a set of linked databases that is or are searchable by location (collectively referred to herein as an "Atlas database", and depicted in FIG. 1 as a table). As further contents are sent by the same or different sending users, the respective contents, locations and triggers are identified by the server 2020 and the Atlas database updated. The result is an Atlas database containing multiple locations associated with various contents and corresponding triggers. It will be appreciated that the Atlas creation process is dynamic, and that the location of step 204 in the flow is merely exemplary. For example, a local "lightweight" Atlas database may also be installed on the consumer device 2030 to allow for some limited localized mapping and images. This may improve functionality when the consumer device's network connection is poor, for example.

In step 205, the server 2020 receives a further consumer update request including a location of the consumer device from a given receiving client 2030.

In step 206, the server 2020 searches the Atlas database using the location of the consumer device to identify any contents or first content identifiers having content locations that correspond to the consumer device's location, and will obtain the associated image trigger or triggers. Said triggers are then sent to the consumer device 2030 (step 207).

Each trigger sent to the consumer device 2030 may be accompanied by a "second" content identifier [the term "second" in this context merely serves to distinguish the content identifier sent to the consumer device 2030 in step 206, from the "first" content identifier which may be provided by the sending user in steps 201-202]. The second content identifier allows the network to identify contents associated with a detected image trigger, in order to serve said contents to the consumer device 2030. For example, the content identifier may be a unique reference number (URN) for use by the network in conjunction with the Atlas database. It will also be appreciated that, where the sending user provides a first content identifier to be distributed to the consumer devices 2030, the second content identifier may be the same as the first content identifier.

The location of the consumer device 2030 may not necessarily have to correspond exactly to the content location in order for the associated image trigger to be obtained in step 206. In particular, an image trigger may be obtained when the consumer device's location lies within a predetermined detection range of the content location. In one example, each piece of content may have an associated adjustable predetermined detection range. The extent of each detection range is not particularly limited, but may be relatively small (e.g. a 100 m, 50 m, or smaller radius centred on the content location) for "standard" messages. This greatly reduces the number of image triggers in the Atlas database which are required to be searched for matches to an image captured by a consumer device 2030 in a particular location, improving the speed and accuracy of content delivery (particularly as the number of sending users and contents increases over time). To ensure fast and reliable trigger identification and content delivery, the number of image triggers supported by the app may be limited within a given area. For example, for any given area defined by a 50 m radius, the number of supported image triggers may be limited to 25 or less.

Image triggers will often be stationary in space or "static", for example at restaurants, stores, hotels, galleries, museums, etc. However, sending users may also wish to provide "dynamic" image triggers, the locations of which may not be fixed. Dynamic image triggers could be provided on public transport such as trains or buses, on flyers, pamphlets, business cards etc, or even as images on webpages. The present method may be adapted to support the use of such dynamic triggers by expanding the detection range for selected "super-sized" contents. "Super-sized" contents may be associated with much larger detection ranges, for example up to 30 km, allowing them to be served to consumer devices across the whole of a city. This feature may be particularly advantageous for companies having different advertising campaigns from city to city, who can tailor their contents accordingly. Even greater detection ranges may be supported, for example of 50 km, 100 km, 200 km, 300 km, 400 km, 500 km, 600 km, 700 km, 800 km, 900 km, 1000 km, or more, to allow for a piece of "super-sized" content to be served across the largest of cities, regions, or even countries.

A number of "global" pieces of content may also be supported, which are servable to a consumer device 2030 at any location worldwide. Of course, each piece of "super-sized" and "global" content constitutes one of the available image triggers for a given location, therefore their numbers may be restricted (e.g. 100 pieces of "super-sized" content per city, or only 1 to 5 pieces of "global" content may be supported at any time).

The detection range and the maximum number of pieces of content supported within a given radius, as well as the maximum number of pieces of "super-sized" and "global"

content, can be increased or decreased depending on various factors, for example improvements in the capabilities of consumer device hardware and mobile networks. The standard detection range may also be adjusted on a region-by-region basis, for example with a greater radius in regions having fewer trigger images and vice versa.

Figure 3:
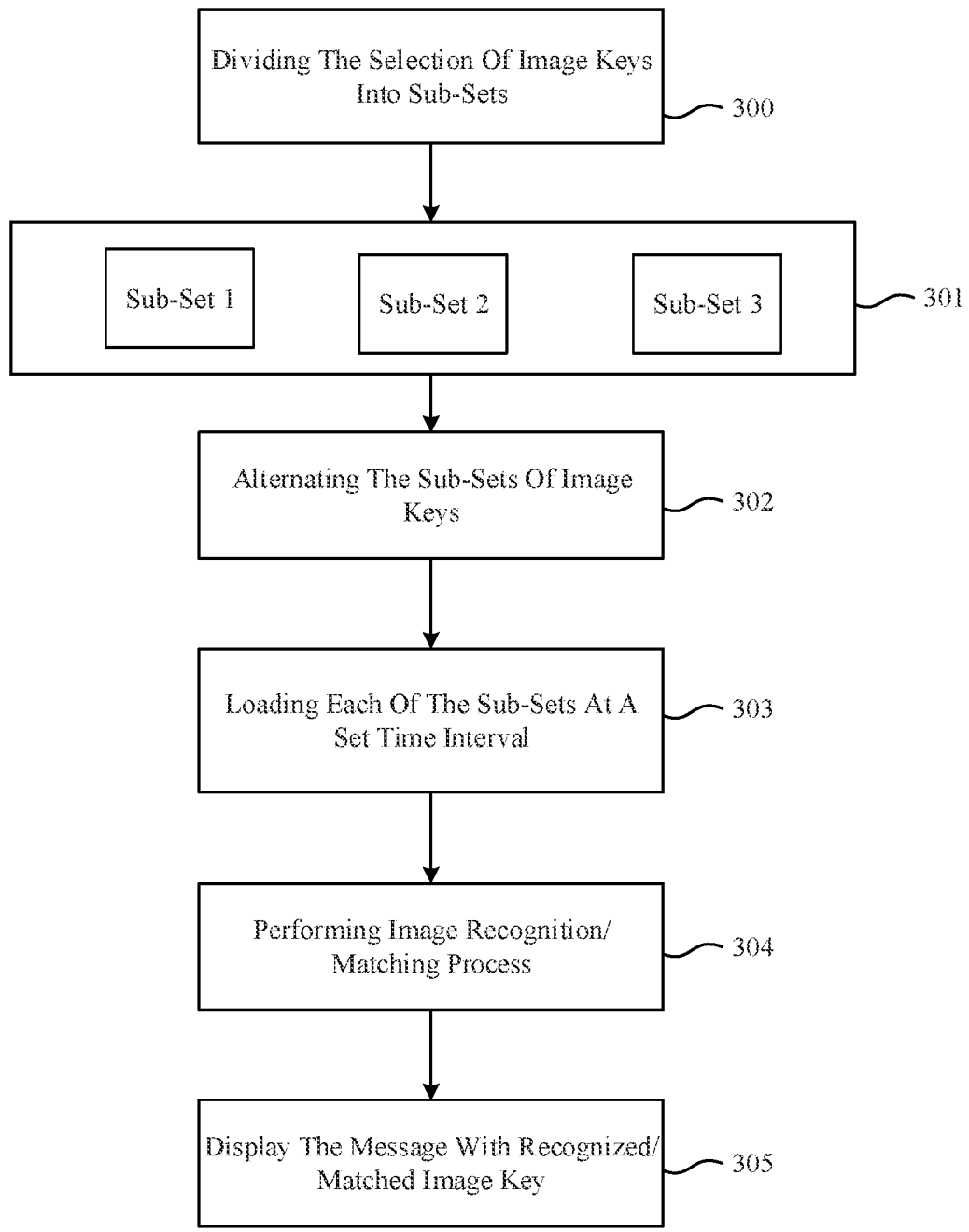
FIG. 3 is a flow diagram illustrating a process for matching image triggers within the flow of FIG. 2.

In step 208—considered in further detail below and with reference to FIG. 3—the consumer device 2030 performs an image recognition process on image data (depicted in FIG. 1 as a frame) captured by the consumer device 2030, to identify the presence of one or more of the image triggers obtained in step 206.

It will be appreciated that the captured image data may not necessarily need to comprise an exact match to the image trigger supplied in step 201 in order to be recognised as corresponding to said trigger. That is, an image trigger may be identified within a piece of captured image data if a predetermined similarity threshold is exceeded. This allows for a single image trigger to cover various modifications which may be made to the physical trigger at the real-life location. For example, where the image trigger is a company product, a captured image of a product with different colour variations or inverted colours may also be recognised as corresponding to the trigger. Similarly, the similarity threshold may be configured to accommodate for minor feature differences (additions or omissions), making the method robust to the evolution of the physical triggers, for example due to marketing updates or even due to dirt/wear and tear.

If the presence of any of the image triggers is detected, the consumer device 2030 may send the corresponding second content identifier to the server 2020 in step 209, and the method proceeds to step 210. Sending a content identifier (e.g. as opposed to returning the identified image trigger to the server 2020) helps to reduce the bandwidth requirements of the method, improving speed and efficiency. Of course, if the second content identifier corresponds to a first content identifier provided by the user in steps 201-202, the method may proceed directly to step 212.

In step 210, the server 2020 uses the second content identifier received from the receiving client 2030 to retrieve contents or a first content identifier corresponding to the detected trigger image, and sends the content or the first content identifier to the consumer device 2030 (step 211).

In step 212, the content or first content identifier may be displayed by the consumer device 2023.

Content may be displayed at the consumer device 2030 in a number of ways, depending upon factors such as the nature of the consumer device 2030, and the format of the message content. In one example, the message content is displayed by augmented reality (AR) display. An AR display is one which overlays display graphics on a real world environment. There are broadly two types of augmented reality displays. In the first type, display graphics are overlaid on an image (generally a live image) taken from a camera. This is the type commonly seen on AR apps for smartphones. In the second type, graphics are displayed on a transparent or translucent display, which the user can look through to see the real world beyond. This type is used for AR headsets, "smart glasses", or "smart windows", and has been proposed for "smart contact lenses". The above disclosure could apply to any of the AR examples given, and will also be applicable to future AR technologies with appropriate modification including holographic displays.

In one example, a content notification may be displayed by the consumer device 2030, awaiting input from the consumer to display the content. Content may also be associated with a passcode, such as a password or PIN code, such the content can only be viewed or accessed after a receiver has entered the passcode into his or her device. The passcode may be derived from biometric data such as a fingerprint or the image of a face. In the case of a password, the user's device may provide a means for recovering a forgotten password, such as by way of displaying a password hint.

It will be appreciated that the receiving client 2030 may or may not be the same device on which the contents may ultimately be displayed. For example, a consumer may have multiple consumer devices which are "paired", for example a smart-phone in communication with a smart-watch (or other smart-accessory such as glasses or contact lenses) via Bluetooth. A first consumer device (e.g. the smart-phone) may carry out one or more of the method steps of the receiving client 2030 as described herein (e.g. providing consumer update requests to the sever 2020 (steps 200, 205), receiving image triggers or contents from the server (steps 207, 211), performing image recognition (step 208), or sending second content identifiers to the server 2020 (step 209). Meanwhile, a second consumer device (e.g. the smart-watch) may perform any remaining method steps, or may simply function as a consumer interface and display for contents served to the first consumer device.

While the above examples have referred to a "sending client" and a "server", the messages may be directly created at the server 2020, rather than being originally obtained from a sending client 2010. For example, this may occur in a setup where an advertiser instructs the operator of the server 2020 to generate a message on their behalf.

The methods described herein may also employ additional techniques to further reduce the number of image triggers which need to be searched for matches to a captured image for a given consumer device location. For example, many mobile devices such as smartphones now possess Light Detection and Ranging (LiDAR) or other range determining functionality. Such functionality may be used to map the space around the consumer device 2030, allowing for the search to be narrowed to a much smaller range, for example of 5-50 mm, drastically reducing the number of image triggers to be searched in the image recognition process.

It will be further appreciated that image data captured by a consumer device may be processed to identify the presence of multiple image triggers in the image data and to subsequently serve to the device or an associated device respective content. The content may be delivered in parallel or sequentially.

Turning now to the detailed means for performing recognition of image triggers at the client device 2030 (step 208 of FIG. 1), as has already been noted, current smartphone operating systems including Android™ and iOS™ already provide for AR core APIs whose functionality can be utilised for this purpose. However, the functionality is limited by the relatively small number of image triggers than can be used at any given time. The approach described above mitigates this problem by allowing for a localisation of image triggers such that the AR core only needs to deal with a (local) subset of all possible image triggers and that is defined by the client device's current location. The local subset may still be relatively small however, e.g. twenty. To address this problem, it is proposed here to subdivide that local subset into a plurality of even smaller "sub-subsets" and cycle through these sub-subsets in turn using the AR core functionality on the device. This is illustrated in FIG. 3.

The client device functionality to implement the approach described here, and communicate with the AR core functionality of the device, may be implemented using a version of the ZOME™ app, available for example from the Apple™ App Store and Google™ Play Store, modified to include the AR core API. ZOME may be considered as an exemplary "component" of the client device and provides for location based messaging where messages can be overlaid on a camera-captured video stream in an AR style. In order to use the additional functionality, the modified app is opened and the camera/AR view selected. If not already done, the app will send a location update to a (ZOME) server and the server will provide to the app a corresponding local subset of image triggers together with respective content identifiers or content for caching locally. The App will in any case send periodic location updates to the server.

During an image scanning operation, e.g. initiated by the user selecting the AR view option within the app, the app will divide the local subset into a plurality of sub-subsets, typically of approximately equal size (although this subdivision may have been performed prior to commencement of the operation). For example, in the case of an Android device, the app may receive a local subset consisting of 60 image triggers from the server and divide this subset to generate three sub-subsets of 20 image triggers each. This is illustrated in steps 300 and 301 of the flow diagram of FIG. 3. The app then cycles through the sub-subsets (step 302) and provides (step 303) each of the sub-subsets of image triggers in turn to the AR core functionality of the device via the AR core API, together with the necessary instructions/data to cause the AR core functionality to search (step 304) the images provided by the device's camera for image triggers of the provided sub-subsets. A new instruction can be provided to the AR core API for example every 1 second, every 0.5 second, or less. The process is repeated in a cyclical manner for as long as the app's AR view remains open. If an image trigger is matched, this is indicated via the AR core API to the app, together with an identification of the matched trigger. The app is configured to react to this notification by obtaining content associated with the trigger and adapting the currently displayed image to show that content (step 305). The content may, for example, be a video that is overlaid on the current display, i.e. that captured by the device's camera. The content may be obtained by downloading it using a URL associated with the matched trigger. Alternatively, respective contents may have been downloaded to the app together with local subset of triggers and saved in a local cache.

It might typically be expected that a user will have the AR view open for at least several second, for example 5-10 seconds, when looking for an image trigger match (or otherwise viewing or capturing a scene). This will allow for at least several searches for each of the sub-subsets of image triggers ensuring that, if one of the triggers of the local subset is present in the scene, this will be recognised.

The method described here may be integrated into a message content delivery service such as that described in U.S. Ser. No. 10/820,144B1. Various features, such as the Atlas database may be common to the message content delivery service and the content delivery service described above.

It will be appreciated by the person of skill in the art that various modifications may be made to the above described embodiments without departing from the scope of the present invention. Modifications include, for example:
Implementing functionality solely on a device, e.g. using a suitable app comprising the AR core API. In this case, the image triggers may be provided with the app.
Implementing the image trigger matching solution without providing or requiring location information.
Generating the image triggers as three dimensional triggers. For example, a trigger may comprise six views of an object from respective different directions. This assumes the AR core is able to match such 3D triggers, e.g. using an integrated LIDAR scanner.

The invention claimed is:

1. A computer-implemented method of identifying the presence of an image trigger in a digitally captured scene, the method comprising, at a component installed on a client device and upon commencement of an image trigger matching operation:
a) obtaining, from a multiplicity of first image triggers, a set of first image triggers;
b) dividing the set of first image triggers into a plurality of image trigger subsets;
c) for each image trigger subset in turn, and at predefined time intervals,
submitting the image trigger subset to an Augmented Reality (AR) core having an Application Programming Interface, API, to cause the client device to:
cache the image trigger subset, wherein any previously cached image trigger subset is overwritten,
perform an image recognition on the digitally captured scene to identify one or more second image triggers captured in the digitally captured scene,
match first image triggers of the image trigger subset with the one or more second image triggers captured in the digitally captured scene, and
identify a positive match using said API of the AR core,
d) the method further comprising, upon completion of step c), repeating step c) one or more times,
wherein the method results in a search of the digitally captured scene which cycles through the image trigger subsets in turn for the image trigger matching operation.

2. The computer-implemented method according to claim 1, wherein said component is an application, app, installed on the client device.

3. The computer-implemented method according to claim 2, wherein the client device is a device running one of Android or Apple iOS, and the AR core is ARCore or ARKit.

4. The computer-implement method according to claim 2, wherein said commencement of the image trigger matching operation occurs upon opening of the app.

5. The computer-implement method according to claim 4, wherein said image trigger matching operation is terminated upon closing of the app or switching to a non-AR view within the app.

6. The method according to claim 1, further comprising:
sending to a server, a request including a current location of the client device; and
receiving in response to said request, from said server, said set of image triggers, the set selected from said multiplicity of image triggers based upon said current location.

7. The method according to claim 1, wherein the client device comprises the AR core, the AR core provides for the identification of a three dimensional object, and each image trigger comprises a plurality of triggers corresponding to different views of an object from different angles.

8. A method of providing Augmented Reality content on a client device, the method comprising:
using a camera of the client device to acquire a digitally captured scene;
displaying the scene on a display of the client device;
obtaining, from a multiplicity of first image triggers, a set of first image triggers;

dividing the set of first image triggers into a plurality of image trigger subsets;
for each image trigger subset in turn, and at predefined time intervals, submitting the image trigger subset to an Augmented Reality (AR) core having an Application Programming Interface, API, to cause the client device to:
  cache the image trigger subset, wherein any previously cached image trigger subset is overwritten,
  perform an image recognition on the digitally captured scene to identify one or more second image triggers captured in the digitally captured scene,
  match, using the API of the AR core, first image triggers of the image trigger subset with the one or more second image triggers captured in the digitally captured scene, and
  identify a matched image trigger from the matching operation;
obtaining content associated with the matched image trigger;
presenting the obtained content as an AR medium on the display, overlaid on the digitally captured scene.

* * * * *